United States Patent [19]

Landry et al.

[11] Patent Number: 5,302,637
[45] Date of Patent: Apr. 12, 1994

[54] MISCIBLE BLENDS OF CELLULOSE ESTERS AND VINYLPHENOL CONTAINING POLYMERS

[75] Inventors: Christine J. T. Landry, Honeyoe Falls; David M. Teegarden, Rochester, both of N.Y.; Kevin J. Edgar, Kingsport, Tenn.; Stephen S. Kelley, Bend, Oreg.

[73] Assignee: Eastman Kodak Company, Rochester, N.Y.

[21] Appl. No.: 917,705

[22] Filed: Jul. 22, 1992

[51] Int. Cl.$^5$ .................. C08F 10/00; C08G 63/00
[52] U.S. Cl. .................. 524/37; 524/38; 524/39; 524/40; 525/54.3
[58] Field of Search .................. 524/37, 38, 39, 40; 525/54.3

[56] References Cited

U.S. PATENT DOCUMENTS

| | | | |
|---|---|---|---|
| 2,208,569 | 7/1940 | Blanchard | 536/64 |
| 3,457,328 | 7/1969 | Blatz | 524/37 |
| 4,314,056 | 2/1982 | Brewer et al. | 536/36 |
| 4,329,447 | 5/1982 | Brewer et al. | 536/69 |
| 4,465,768 | 8/1984 | Ueno et al. | 430/300 |

OTHER PUBLICATIONS

R. T. Bogan, et al., "Cellulose Esters Organic," *Encyclopedia of Polymer Science and Engineering*, 2nd Edition, Publisher: John Wiley & Sons, vol. 3 (1985), pp. 158–181.

V. Shah, Ed. *Handbook of Plastics Testing Technology*, Publisher: John Wiley & Sons (1984) pp. 90–92.

Fordyce, et al., *Industrial and Engineering Chemistry*, vol. 18 (1946) pp. 547–550.

*Primary Examiner*—Morton Foelak
*Assistant Examiner*—Jeffrey Culpeper Mullis
*Attorney, Agent, or Firm*—Judith A. Roesler; J. Jeffrey Hawley

[57] ABSTRACT

There are provided novel miscible blend compositions comprising (a) a cellulose ester and (b) a vinylphenol containing polymer. The blends do not exhibit large scale phase separation and provide properties which are essentially intermediate between those of either cellulose ester or vinylphenol containing polymers. The blends are useful for both molded and film applications as well as for coatings.

19 Claims, No Drawings

MISCIBLE BLENDS OF CELLULOSE ESTERS AND VINYLPHENOL CONTAINING POLYMERS

FIELD OF THE INVENTION

The present invention relates to miscible blends of polymers. The miscible blends exhibit a single glass transition temperature and are useful for both molded and film applications as well as coatings.

BACKGROUND OF THE INVENTION

Cellulose, a polyhydroxy compound, forms esters with organic acids, anhydrides, and acid chlorides. Cellulose esters of almost any organic acid can be prepared.

Although the different types of cellulose esters are useful in many applications, cellulose esters are generally restricted in their usefulness by their moisture sensitivity, limited compatibility with other synthetic resins, and relatively high processing temperatures. Cellulose esters of higher aliphatic acids (for example, propionates and butyrates) circumvent these shortcomings with varying degrees of success.

Discovering methods to assist in making the cellulose esters more versatile for a wider variety of uses is desirable. Blending the cellulose esters with other classes of polymers is an option. In the majority of polymeric blends, however, the components tend to phase separate to form heterogeneous, immiscible blends. Only in a limited number of cases do polymers blend to form one-phase, miscible blends. Few miscible blends of cellulose esters with other polymers are known.

Blended polymers are not useful for many applications unless the blend is miscible. This is because immiscible blends have low physical attractive forces across the phase boundaries and suffer from delamination at the phase boundaries. Immiscible blends tend to be turbid which excludes them from many applications. Miscible polymer blends, on the other hand, are desirable because of their optical clarity and strength since they are not phase separated and thus stratification of the polymeric components during or after processing is generally avoided. Consequently, miscible blends are useful in many applications. The miscibility of polymer blends can be identified by many different techniques. For example, the properties of optical transparency (in the absence of crystallinity) and a single glass transition temperature are indicative of miscible blends. Additionally, nuclear magnetic resonance, transmission electron microscopy, and excimer fluorescence are methods by which blends may be examined for miscibility (as discussed in *Concise Encyclopedia of Science and Engineering*, Ed. J. I. Kroschwitz, published by John Wiley & Sons, Inc., 1990, pp.629-632). As used herein, a miscible blend is defined as a blend of two or more polymers that behaves as a single, homogeneous (solid or liquid) material, exhibiting a single glass transition temperature (hereinafter "$T_g$").

It would be highly desirable to find a polymeric component that forms a miscible blend with cellulose ester polymers, thus broadening the range of usage of cellulose esters.

SUMMARY OF THE INVENTION

In accordance with the present invention there are provided novel miscible blend compositions comprising (a) a cellulose ester and (b) a vinylphenol containing polymer.

It is an advantageous feature of this invention that the above-described blends are miscible and do not exhibit large scale phase separation. The miscibility of each novel blend is demonstrated by the presence of a single, composition dependent $T_g$ rather than two $T_g$ values (one for each polymeric component). Each novel miscible blend is transparent, homogeneous, and exhibits properties that are intermediate between those of cellulose ester and vinylphenol containing polymers.

The novel blends are particularly useful for coatings applications, lacquers, membranes, plastics applications, and as adhesion promoters due to their optical clarity, decreased moisture absorption, and increased solvent resistance. Other uses will be apparent to those skilled in the art.

DETAILED DESCRIPTION OF THE INVENTION

As known to those skilled in the art, the values of $T_g$ reported for the same polymer may vary sometimes as much as 10°-20° C., depending on the method of measurement used and on the thermal history of the sample, because the glass transition occurs over a temperature range rather than at a single, sharply defined temperature. The $T_g$ can be measured by a number of techniques known to those skilled in the art, including, for example, dilatometry (qv), differential scanning calorimetry (DSC), dynamic mechanical measurement, and dielectric measurement. Miscible blends exhibit a single $T_g$ value whereas immiscible blends do not (in other words, an immiscible binary blend will exhibit two $T_g$ values). A general discussion of $T_g$ is found in the *Concise Encyclopedia of Science and Engineering*, Ed. J. I. Kroschwitz, published by John Wiley & Sons, Inc., 1990, pp. 433-434.

All cellulose esters are considered suitable for this invention. As known to those skilled in the art, properties of the various types of cellulose esters are affected by the number of acyl groups per anhydroglucose unit, acyl chain length, position of substitution, and the degree of polymerization (DP) (molecular weight). The novel blends exhibit properties that are intermediate between the properties of the pure cellulose ester and the vinylphenol containing polymer. Many of the mixed esters (particularly the cellulose acetate butyrates and cellulose acetate propionate series) have relatively low glass transition temperatures and melting temperatures. The addition of a higher glass transition temperature vinylphenol containing polymer to these mixed esters will result in a blend having an increased glass transition temperature, and hence, an increased heat deflection temperature. (For a discussion of heat deflection temperature, see V. Shah, Ed., *Handbook of Plastics Technology*, published by John Wiley & Sons, Inc., 1984, pp.90-92.) It has also been found that blending the vinylphenol containing polymers with those cellulose esters that are used in coating applications and as lacquers is particularly useful for purposes of altering cellulose ester solvent resistance and moisture absorption.

Preferably, the cellulose esters have a molecular weight falling within the range of from about 10,000 to about 200,000 g/mole (number average molecular weight in polystyrene equivalents, as determined using gel permeation chromatography). Included, for example, are cellulose acetates, cellulose propionates, cellulose butyrates, mixed esters of cellulose acetate butyrates, cellulose acetate propionates, mixtures thereof, and so on. As described below, and hereinafter, all weight percentages pertaining to the cellulose esters based on the weight of the acyl groups per repeating unit divided by the weight of the repeating unit, as described by Fordyce, et al. in *Industrial and Engineering Chemistry*, Vol. 18, (1946) pp. 547-550.

The cellulose acetates preferably have an average acetyl content within a range from about 20 to about 45 weight percent and include cellulose monoacetate (CA), cellulose diacetate (CDA), and cellulose triacetate (CTA). The cellulose acetate butyrates (CAB) preferably have an average acetyl content of between about 0.01 to about 30 weight percent and a butyryl content of from about 1 to about 55 weight percent. The cellulose acetate propionates (CAP) preferably have an average acetyl content of between about 0.01 to about 45 weight percent and an average propionyl content of between about 10 to about 52 weight percent. Most preferably employed as the cellulose ester are cellulose acetates having an average acetyl content of between about 32 to about 43 weight percent, cellulose tripropionate with a propionyl content of between about 47 to about 52 weight percent, and cellulose acetate propionate having an average acetyl content of between about 2 to about 30 weight percent and a propionyl content of between about 12 to about 45 weight percent.

Also encompassed in the definition of cellulose esters are cellulose esters that may contain optional components prior to their blending with the vinylphenol containing polymers. For example, cellulose esters that may be employed in the present invention may contain antioxidants, plasticizers, acid scavengers, diluents, retarder solvents, thermal stabilizers, and the like.

The cellulose esters are well known and widely available commercially. Cellulose esters may be prepared by a number of techniques known to those skilled in the art, as disclosed in U.S. Pat. Nos. 2,208,569 (issued Jul. 23, 1940), 4,314,056 (issued Feb. 2, 1982) and 4,329,447 (issued May 11, 1982), all assigned to Eastman Kodak Co., and *Encyclopedia of Polymer Science and Engineering*, 2nd Ed., Wiley, 1985, Vol. 3, pp. 158-181. For example, cellulose acetate may be produced by controlled esterification and hydrolysis of purified raw cellulose with acetic acid and acetic anhydride. In this process, acetyl groups are substituted for all or a portion of the hydrogen atoms of the hydroxyl units of the cellulose chain. In order to obtain soluble cellulose acetates, the acetylation is carried to completion first to form cellulose triacetate and then followed by hydrolysis to lower the acetyl content to the desired level.

The vinylphenol containing polymer suitable for this invention is defined as having repeating units derived from vinylphenol or derivatives of vinylphenol, as represented by the general formula (I), as follows,

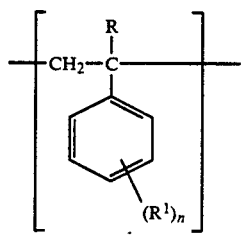

I wherein,
R is hydrogen or methyl;
n is an integer from 1 to 5; and $R^1$ may be the same or different and represents —OH, —OSi$(R^2)_3$, —OR$^2$, —OCOR$^2$, —OM, or tertbutyloxycarbonyloxy;
wherein
$R^2$ represents a straight or branched $C_1$ to $C_5$ alkyl group (such as, for example, methyl, ethyl, propyl, isopropyl, n-butyl, t-butyl, or pentyl), a $C_6$ to $C_{18}$ aryl group (such as, for example, benzyl, phenyl, toluyl and biphenyl), or an alkyl ether group of 2 to 5 carbon atoms (such as, for example, methoxymethyl, ethoxymethyl, and methoxyethyl); and
M represents metal cation (including, for example, univalent or divalent alkali metal cations and alkaline earth or transition metal cations including sodium, magnesium, calcium, lithium, potassium or zinc cations).

In addition to the substituent on the pendant benzene ring as represented by $R^1$, the pendant benzene ring can be substituted in up to two of the remaining positions with non-interfering substituents selected from straight or branched $C_1$ to $C_4$ alkyl groups (such as, for example, methyl, ethyl, propyl, isopropyl or butyl), halo atoms (such as, for example, fluoro, chloro, bromo or iodo), straight or branched $C_1$ to $C_4$ haloalkyl groups (such as, for example, $CF_3$, $CH_2Br$, $CF_2CF_3$), or carboxy groups.

The vinylphenol containing polymer can be a homopolymer or a copolymer. When a homopolymer, a single type of monomeric unit (as described by formula I) is polymerized. When a copolymer, monomeric units are copolymerized with suitable comonomers, wherein at least 10 mole percent, preferably at least 20 mole percent, of the copolymer is the vinylphenol or vinylphenol derivative defined by formula I. Suitable comonomers that may be copolymerized include $\alpha,\beta$-ethylenically unsaturated monomers. Preferred monomers include, for example, styrene, $\alpha$-methylstyrene, $C_1$ to $C_{12}$ alkyl acrylates (such as, for example, methyl methacrylate, methyl acrylate, ethyl methacrylate, ethyl acrylate, butyl methacrylate, butyl acrylate, and so on), methacrylates, and mixtures thereof. More preferably employed as a comonomer is styrene.

More preferably, the vinyl containing polymer is defined wherein R is hydrogen, n is 1, and $R^1$ is in the para position and $R^1$ is either an —OH or if $R^1$ is defined by a substituent other than the —OH, the substituent is converted to an —OH group before it is blended with the cellulose ester. The conversion of the substituent to an —OH group can be accomplished by various methods known to those skilled in the art, such as, for example, by catalytic removal of dimethyl-t-butylsilyl or t-butyloxycarbonyloxy (as further illustrated in Example I), or by heat treatment at temperatures of greater than about 150° C. of t-butyloxycarbonyloxystyrene containing polymer prior to or during the melt blending process. Most preferably the vinylphenol containing polymer is a poly(vinylphenol) homopolymer.

The preferred range for the molecular weight of the vinylphenol containing polymer is between about 1,500 g/mole and about 500,000 g/mole. Particularly preferred are vinylphenol containing polymers having a molecular weight between about 20,000 g/mole and about 100,000 g/mole because the physical properties of these polymers are generally more desirable, such as, for example, strength, higher $T_g$ and heat distortion temperature. Additionally, these polymers are preferred because they have better melt processability and better film forming properties.

The vinylphenol containing polymers suitable for this invention are known and can be prepared by the various methods known to those skilled in the art. For example, the preparation of high molecular weight vinylphenol containing polymers is described in Frechet et al., "Novel Derivative of Poly(4-hydroxystyrene) with Easily Removable Tertiary, Allylic or Benzylic Ethers," *Polymer Bulletin,* Vol. 20, pp. 427-434 (1988). For the general discussion of the polymerization of vinyl monomers, see G. Odian, "Principles of Polymerization," 2nd Ed., Wiley-Interscience, New York 1981.

Additional components which may be included in the miscible blend prior to or during the blending of cellulose ester and vinylphenol containing polymer include diluents, retarder solvents, plasticizers, thermal stabilizers, acid scavengers, antioxidants, mixtures thereof, and so on. The diluents are useful for modification of the viscosity of the blend when, for example, the blend is used as a solvent coating. Examples of diluents suitable include, for example, toluene, hexane, and xylene. The retarder solvents that may be included are useful, for example, in slowing down the solvent evaporation rate of the blend and to produce a desirable finish when the blend is employed as a lacquer. Examples of suitable retarder solvents include, for example, ethylene glycol monomethyl ether acetate, diacetone alcohol, ethyl lactate, and cyclohexanol. The inclusion of plasticizers and thermal stabilizers is particularly useful when the blend, for example, is employed for melt extrusion applications. Examples include ethyl phthalyl ethyl glycolate, methyl phthalyl ethyl glycolate, methyl o-benzoylbenzoate, and tributyl phosphate.

Although plasticizers are encompassed in the present invention, the inventive blend helps to eliminate the need to use such additives. In the melt extrusion of cellulose esters, a problem often encountered is the high melt viscosity of the cellulose ester. The plasticizer compound is typically added to decrease the viscosity. The plasticizers, however, frequently are not retained over time, leading to changes over time in the physical properties of the cellulose ester coating or item of manufacture. The blending of the vinylphenol containing polymer with the cellulose acetate containing polymer, however, can change the melt viscosity because the vinylphenol containing polymer has a lower melt viscosity. In addition, the vinylphenol polymer will remain permanently in the finished product since the vinylphenol containing polymer is essentially nonvolatile (in contrast to plasticizers which are volatile). Thus, the properties of the blend will generally not change with time.

The miscible blends of this invention are readily prepared by mixing about 1 to 99 parts by weight of component (a) with about 99 to 1 parts by weight of component (b), based on the 100 parts of the combined components (a) and (b). As a practical matter, most of the polymers are miscible over the entire concentration range.

Any number of methods known to those skilled in the art may be employed in blending the cellulose ester and the vinylphenol containing polymer. For example, the polymers can be mixed in their powder form and then melt blended by melt mixing and extruding the mixture in a screw extruder. In another method, the polymer components can be wet blended by dissolving both components in a solvent common for both polymers and then precipitating the blend in a nonsolvent for both of the polymers. The various polymers included in this invention may have different solubility characteristics, thus the solvent and nonsolvent must be appropriately selected, as easily determined by one skilled in the art. Examples of solvents which may be employed, include, but are not limited to, methyl acetate, acetone, methyl ethyl ketone, acetic acid, and so on. Additionally, mixtures of solvents may also be employed. Examples of nonsolvents include, but are not limited to, hexane, water, methanol, and so on. Alternatively, rather than precipitating the blend in a non-solvent, the wet blending can be accomplished by casting or coating the blend solution onto an inert substrate and allowing the blend solution to dry to form the miscible blend.

In accordance with this invention, the novel blends exhibit the homogeneity of a single material, as determined by a single $T_g$. If so desired, the components may be separated by conventional techniques after blending. Optionally, the blends may be cured by crosslinking the phenol units by including any curing agent as known in the art (such as, for example, diisocyanates, diepoxides, or aldehydes), bymethods known to those skilled in the art. Further, under certain conditions (such as, for example, exposure to high temperatures during melt processing) a small amount of the phenol may react with the cellulose ester in an interchange reaction.

The novel blends are useful for both molded applications and as coatings or films. The blends are particularly useful for applications typically associated with the cellulose esters, such as for example, packaging, textile fibers, plastics, film sheeting, lacquers, coatings applications, membranes, and as adhesion promoters.

Blends prepared in accordance with the invention may be clear or opaque, depending upon the starting materials employed. The blends are useful for molded parts, structural applications, coatings, or packaging. Further, those blends having clarity are especially useful for clear packaging and protective coatings. The novel blends have also been found to exhibit generally decreased moisture absorption and increased solvent resistance to halogenated solvents (such as, for example, dichloromethane and chloroform) when compared to the pure cellulose ester polymers.

EXAMPLES

The following examples are intended to illustrate more fully the nature of the invention without acting as a limitation upon its scope. Other compositions can readily be prepared in light of this disclosure and guiding principles and teachings provided herein. As shown below, $T_g$ represents the onset value of the glass transition temperature. All the blends illustrated in these examples were analyzed by differential scanning calorimetry (DSC) employing a Perkin-Elmer DSC7, with each of the miscible blends of the invention found to have a single $T_g$. As identified herein, the optical transparency of each blend was visually identified as such. The cellulose esters employed were obtained from Eastman Chemical Co., Kingsport, Tenn., unless otherwise noted. The degree of substitution (DS) or acetyl content of cellulose acetate is determined by saponifying a known amount of the ester in a known excess of a standard sodium hydroxide solution in the presence of a swelling agent or solvent, as described in *Encyclopedia of Polymer Science and Engineering,* 2nd Ed., Wiley, 1985, Vol. 3, p. 173.

EXAMPLE I

An amorphous vinylphenol containing polymer was prepared by first obtaining poly [4-(t-butyloxycarbonyloxy)styrene] [hereinafter "poly(tBOC styrene)"]

from the Synthetic Chemicals Division, Eastman Kodak Company. Deprotection of the poly(tBOC styrene) to form poly(vinylphenol) (hereinafter "PVPh") was carried out in a three-necked, round-bottomed flask equipped with mechanical stirrer, reflux condenser, and argon inlet tube by dissolving it under argon in sufficient p-dioxane to make a 15-20% solution. Trifluoroacetic acid was then added and the solution refluxed for 48 hours. The clear reaction mixture was precipitated into a large excess of water forming a white polymer. The polymer (now PVPh) was filtered and washed well with water until the pH of the washes was 6. The PVPh was then dried in a vacuum oven a 75° C. for at least 72 hours before use. The absolute weight average molecular weight of the PVPh used was 35,000 g/mole, as determined by size exclusion chromatography (SEC). The onset $T_g$ value for the PVPh was 183° C. A cellulose tripropionate (CTP), having an onset $T_g$ of 121° C., was prepared according to the method described in U.S. Pat. No. 2,208,569.

The CTP (1 g) was dissolved in methyl ethyl ketone (MEK) (19 g), resulting in a 5 weight % solution. The PVPh (1 g) was similarly dissolved in MEK (19 g) at a 5 weight % concentration. The two solutions were mixed in various proportions to form clear and stable solutions in the following CTP:PVPh ratios: 1:3, 1:1, and 3:1. Each polymer solution was co-precipitated into a 10:1 excess of hexane, forming a white powder (the miscible blend product) which was collected by filtration. The $T_g$ values measured for the CTP:PVPh ratios are as follows: 1:3 ratio, $T_g=158°$ C.; 1:1 ratio, $T_g=139°$ C.; and 3:1 ratio, $T_g=123°$ C.

EXAMPLE II

The procedures of Example I were repeated, differing only with respect to the method of blending employed. Rather than wet blending, the CTP and PVPh were ground to fine powders, combined in a 1:1 composition by weight, and melt extruded at a temperature of 254° C. using a MICROTRUDER® laboratory extruder equipped with a ¼" screw and a 2" slit die. A transparent film of the blend was obtained which showed a single $T_g$ having an onset value of 139° C.

EXAMPLE III

A cellulose diacetate having a 40 weight percent acetyl, with a 2.5 degree of substitution (hereinafter "DS" as described hereinbefore), (purchased as CA-398-30 from Eastman Chemical Co.) was blended with PVPh (purchased from Polysciences, Inc., Warrington, Pa., U.S.A., having an average molecular weight of 30,000 g/mole and a $T_g$ of 149° C.). Prior to blending, each polymer was dissolved in methyl acetate to form a polymer concentration of 10 weight %, based on total weight of the solution (in other words, 1 part polymer to 9 parts solvent). The polymer solutions were then combined into a number of proportions, as identified in TABLE I below. The solutions were cast onto inert substrates. The solvent was then removed from each blend solution by evaporation. Thereafter the blends were removed from the substrates to form self-supporting films. The blend films were transparent and exhibited single $T_g$ values, indicating their miscibility. The tensile strength of each blend film was determined using ASTM# Standard D-882 (1985), with results recorded in Table I.

TABLE I

| Weight % CA-398-30 / | Weight % PVPh | Tg (°C.) | Tensile Strength (psi) |
|---|---|---|---|
| 100 / | 0 | 188 | 10.2 |
| 95 / | 5 | 184 | 11.0 |
| 90 / | 10 | 181 | 11.0 |
| 80 / | 20 | 174 | 11.4 |
| 70 / | 30 | 168 | 10.3 |
| 60 / | 40 | 165 | 10.4 |
| 40 / | 60 | 154 | — |
| 20 / | 80 | 152 | — |
| 0 / | 100 | 149 | — |

EXAMPLE IV

The procedure of Example III was repeated modifying the ratio of CA-398-30:PVPh to 4:1 and substituting acetic acid as the solvent. The resulting blend film was transparent thus indicating its miscibility.

EXAMPLE V

The procedure of Example IV was repeated substituting acetone as the solvent. The resulting blend was transparent thus indicating its miscibility.

EXAMPLE VI

The procedure of Example III was repeated substituting the cellulose acetate obtained as CA-435-75S (having a DS of 2.9) in a 4:1 ratio of cellulose acetate:PVPh and substituting acetic acid as the solvent. The resulting blend film was transparent thus indicating its miscibility.

EXAMPLE VII

The procedure of Example III was repeated substituting the cellulose acetate obtained as CA-320-S (having a DS of 1.8) in a 4:1 ratio of cellulose acetate:PVPh and substituting acetic acid as the solvent. The resulting blend film was transparent thus indicating its miscibility.

EXAMPLE VIII

Cellulose acetate propionate (CAP-141-20) obtained from Eastman was precompounded at 240° C. with the antioxidant di-TPP (a dimer of triphenylphosphate) at 12.5 weight % and 3.5 wt % of a polymeric plasticizer and toughening agent. A 50/50 weight % blend of this mixture was prepared with PVPh (obtained from Polysciences, Inc.) by mixing the dry powders of each, and then melt extruding the mixture at a temperature of 249° C., using a MICROTRUDER laboratory extruder equipped with a ¼" screw and a 2" slit die. An optically clear film was obtained that showed a single $T_g$ at 137° C., which is intermediate between the $T_g$ of the CAP ($T_g=127°$ C.) and PVPh ($T_g=183°$ C.).

EXAMPLE IX

Cellulose tripropionate (CTP, as identified in Example I) was blended with random copolymers of styrene and vinylphenol. The copolymers were obtained as powders from a conventional free radical copolymerization of styrene and tBOCstyrene and subsequent deprotection, as described in Example I. Copolymers used in blend samples A-E differed with respect to the mole percentage of vinylphenol present in the copolymer, as shown in TABLE II below. The CTP (1 g) was dissolved in methyl ethyl ketone (MEK, 19 g) resulting in a polymer concentration of 5 weight %. The copolymer (1 g) was also dissolved in MEK (19 g). The two solutions were mixed in equal amounts (1:1) and the polymers were then co-precipitated into a 10:1 excess of hexane forming a white powder (the blend product) which was separated from the solvent by filtration. This process was repeated for blends of CTP with each copolymer and polystyrene (PS) as a control. The PS used was obtained commercially as DOW PS 685D from the Dow Chemical Co. (Midland, Mich., U.S.A.). The presence of a single $T_g$ (found for blend samples A, B, and C) indicates that the polymers are miscible. Since the $T_g$ of the copolymers containing 22 mole % of vinylphenol is identical to the $T_g$ of CTP, miscibility could not be determined unambiguously by DCS ($T_g$) alone. Therefore this blend powder (sample B) was also melt pressed in a Carver Press at 240°–260° C. and 10,000 lbs. The resulting film was optically transparent, indicating miscibility. In contrast, sample blends D and E exhibited two $T_g$ values and were opaque when melt pressed as above thus indicating that they were immiscible.

TABLE II

Properties of CTP/poly(styrene-co-vinylphenol) Blends.

| Sample | Mole % vinylphenol in copolymer | CTP/ copolymer ratio | Tg (°C.) onset | Miscible |
| --- | --- | --- | --- | --- |
| Blend A | 52 | 1/1 | 120 | yes |
| copolymer (unblended) | 52 | 0/1 | 148 | |
| Blend B | 22 | 1/1 | 107 | yes |
| copolymer (unblended) | 22 | 0/1 | 122 | |
| Blend C | 14 | 1/1 | 104 | yes |
| copolymer (unblended) | 14 | 0/1 | 113 | |
| Blend D | 5 | 1/1 | 105/120 | no |
| copolymer (unblended) | 5 | 0/1 | 107 | |
| Blend E | 0 | 1/1 | 104/123 | no |
| copolymer (unblended) | 0 | 0/1 | 101 | |

EXAMPLE X

CAP 482-0.5, having an average acetyl content of 2.5 and an average propionyl content of 45 weight % was dissolved in methyl acetate at a concentration of 10 weight %. A random copolymer of styrene and vinylphenol, having an average vinylphenol content of 50% was purchased from Hoechst Celanese and was dissolved in methyl acetate at a concentration of 10 weight %. Four parts of the CAP solution were mixed with one part of the poly(styrene-co-vinylphenol) solution. The mixture was cast into a dish and dried. The resulting blend film was optically transparent, thus indicating its miscibility.

The invention has been described in detail with particular reference to preferred embodiments thereof, but it will be understood that variations and modifications can be effected within the spirit and scope of the invention. All patents, patent applications (published or unpublished, domestic or foreign), scientific literature, books and other prior art cited herein are each incorporated herein by reference for the teaching therein pertinent to this invention.

That which is claimed is:

1. A miscible blend composition comprising (a) a cellulose ester and (b) a vinylphenol homopolymer, defined as having repeating units derived from vinylphenol or derivatives of vinylphenol, as represented by the general formula (I) as follows,

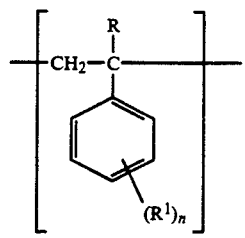

wherein,
R is hydrogen or methyl;
n is an interger from 1 to 5; and
$R^1$ may be the same or different and represents —OH, —OSi($R^2$)$_3$, —O$R^2$, —OCO$R^2$, —OM, or tert-butyloxycarbonyloxy;
$R^2$ represents a straight or branched $C_1$ to $C_5$ alkyl group, a $C_6$ to $C_{18}$ aryl group, or an alkyl ether group of 2 to 5 carbon atoms; and
M represents metal cation,
wherein said miscible blend has a single glass transition temperature.

2. A miscible blend according to claim 1 wherein said cellulose esters are selected from the group consisting of cellulose acetates, cellulose propionates, cellulose butyrates, mixed esters of cellulose acetate butyrates, cellulose acetate propionates, and mixtures thereof.

3. A miscible blend according to claim 2 wherein said cellulose ester comprises, prior to blending, a component selected from the group consisting of an antioxidant, a plasticizer, and acid scavenger, a diluent, a retarder solvent, a thermal stabilizer, or mixtures thereof.

4. A miscible blend according to claim 1 wherein said cellulose ester is a cellulose acetate having an average acetyl content of between about 20 and about 45 weight percent.

5. A miscible blend according to claim 1 wherein said cellulose ester is a cellulose acetate butyrate having an average acetyl content of between about 0.01 and about 30 weight percent and a butyryl content of between about 1 to about 55 weight percent.

6. A miscible blend according to claim 1 wherein said cellulose ester is a cellulose acetate propionate having an average acetyl content of between about 0.01 to about 45 weight percent and an average propionyl content of between about 10 to about 52 weight percent.

7. A miscible blend according to claim 1 wherein said cellulose ester is selected from the group consisting of cellulose acetate having an average acetyl content of between about 32 to about 43 weight percent; cellulose acetate propionate having an average acetyl content of between about 2 to about 30 weight percent and a propionyl content of between about 12 to about 45 weight percent; and cellulose tripropionate with a propionyl content of between about 47 to about 52 weight percent.

8. A miscible blend according to claim 7 wherein said cellulose ester is selected from the group consisting of cellulose acetate having an average acetyl content of between about 20 and about 45 weight percent; cellulose acetate butyrate having an average acetyl content of between about 0.01 and about 30 weight percent and a butyryl content of between about 1 to about 55 weight percent; and cellulose acetate propionate having an average acetyl content of between about 0.01 to about 45 weight percent and a propionyl content of between about 10 to about 52 weight percent.

9. A miscible blend according to claim 7 wherein said cellulose ester is selected from the group consisting of cellulose acetate propionate having an average acetyl content of between about 2 to about 30 weight percent and a propionyl content of between about 12 to about 45 weight percent; cellulose acetate having an average acetyl content of between about 32 to about 43 weight percent; and cellulose tripropionate with a propionyl content of between about 47 to about 52 weight percent.

10. A miscible blend according to claim 1 wherein said cellulose ester is present in an amount from about 1 to 99 parts by weight and said vinylphenol containing polymer is present in an amount from about 99 to 1 parts by weight, with parts by weight based on the combined weight of said cellulose ester and said vinylphenol containing polymer.

11. A miscible blend according to claim 1 further comprising an additional component selected from the group consisting of a diluent, a retarder solvent, a plasticizer, a thermal stabilizer, an acid scavenger, an antioxidant, or mixtures thereof.

12. A process for preparing the miscible blend according to claim 1 comprising melt blending or wet blending said polymers.

13. An article of manufacture comprising the blend recited in claim 1 wherein the article is a film.

14. A miscible blend composition comprising (a) a cellulose ester and (b) a copolymer, wherein said miscible blend has a single glass transition temperature, and said copolymer comprises an $\alpha,\beta$-ethylenically unsaturated comonomer and at least 10 mole percent of vinylphenol comonomer of the structure defined as having repeating units derived from vinylphenol or derivatives of vinylphenol, as represented by the general formula (I) as follows,

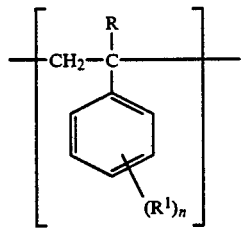

wherein,
R is hydrogen or methyl;
n is an interger from 1 to 5; and
$R^1$ may be the same or different and represents —OH, —OSi($R^2$)$_3$, —O$R^2$, —OCO$R^2$, —OM, or tert-butyloxycarbonyloxy;
$R^2$ represents a straight or branched $C_1$ to $C_5$ alkyl group, a $C_6$ to $C_{18}$ aryl group, or an alkyl ether group of 2 to 5 carbon atoms; and
M represents metal cation.

15. A miscible blend according to claim 14 wherein said $\alpha,\beta$-ethylenically unsaturated comonomer is selected from the group consisting of styrene, $\alpha$-methylstyrene, $C_1$ to $C_{12}$ alkyl acrylates, and methacrylates.

16. A miscible blend according to claim 15 wherein said comonomers are vinylphenol and styrene.

17. A miscible blend according to claim 16 wherein said cellulose ester is selected from the group consisting of cellulose acetates, cellulose propionates, cellulose butyrates, mixed esters of cellulose acetate butyrates, cellulose acetate propionates, and mixtures thereof.

18. A miscible blend according to claim 17 wherein said cellulose ester is selected from the group consisting of cellulose acetates, cellulose propionate, cellulose butyrates, mixed esters of cellulose acetate butyrates, cellulose acetate propionate, and mixtures thereof.

19. A miscible blend according to claim 18 wherein said cellulose ester is selected from the group consisting of a cellulose acetate propionate having an average acetyl content of between about 2 to about 30 weight percent and a propionyl content of between about 12 to about 45 weight percent; a cellulose acetate having an average acetyl content of between about 32 to about 43 weight percent; and a cellulose tripropionate with a propionyl content of between 47 to about 52 weight percent.

* * * * *